(12) United States Patent
Nilsson et al.

(10) Patent No.: US 10,998,939 B2
(45) Date of Patent: May 4, 2021

(54) BEAMFORMED RECEPTION OF DOWNLINK REFERENCE SIGNALS

(71) Applicant: Telefonaktiebolaget LM Ericsson (publ), Stockholm (SE)

(72) Inventors: Andreas Nilsson, Gothenburg (SE); Sebastian Faxér, Järfälla (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 206 days.

(21) Appl. No.: 16/342,437

(22) PCT Filed: Mar. 27, 2019

(86) PCT No.: PCT/EP2019/057789
§ 371 (c)(1),
(2) Date: Apr. 16, 2019

(87) PCT Pub. No.: WO2020/192915
PCT Pub. Date: Oct. 1, 2020

(65) Prior Publication Data
US 2020/0366359 A1    Nov. 19, 2020

(51) Int. Cl.
*H04B 7/0408* (2017.01)
*H04B 7/06* (2006.01)
(Continued)

(52) U.S. Cl.
CPC ......... *H04B 7/0408* (2013.01); *H04B 7/0617* (2013.01); *H04B 7/0626* (2013.01);
(Continued)

(58) Field of Classification Search
CPC ... H04B 7/02–12; H04B 17/0082–3913; H04J 11/0023–0093;
(Continued)

(56) References Cited

U.S. PATENT DOCUMENTS

| 9,065,521 B1* | 6/2015 | Dybdal | H04B 1/1036 |
| 2012/0076031 A1* | 3/2012 | Zeira | H04B 7/0617 |
| 2014/0098695 A1* | 4/2014 | Jeong | H04B 7/0619 |

FOREIGN PATENT DOCUMENTS

EP    2981001 A1    2/2016

OTHER PUBLICATIONS

International Search Report dated Nov. 25, 2019, issued in International Application No. PCT/EP2019/057789 (5 pages).
(Continued)

*Primary Examiner* — Timothy J Weidner
(74) *Attorney, Agent, or Firm* — Rothwell, Figg, Ernst & Manbeck, P.C.

(57) ABSTRACT

There is provided mechanisms for beamformed reception of downlink reference signals. A method is performed by a terminal device. The method comprises obtaining direction-wise measurements of interference experienced by the terminal device. The method comprises generating, based on the direction-wise measurements of interference, a beam having a beam gain that is lower in those directions where a first interference level is experienced than in those directions where a second interference level is experienced, where the first interference level is higher than the second interference level. The method comprises receiving, using the generated beam, downlink reference signals from a network node.

20 Claims, 9 Drawing Sheets

(51) Int. Cl.
| | | |
|---|---|---|
| *H04B 7/08* | (2006.01) | |
| *H04B 17/336* | (2015.01) | |
| *H04B 17/345* | (2015.01) | |
| *H04J 11/00* | (2006.01) | |
| *H04L 5/00* | (2006.01) | |
| *H04W 24/10* | (2009.01) | |
| *H04W 52/24* | (2009.01) | |
| *H04W 52/42* | (2009.01) | |
| *H04W 56/00* | (2009.01) | |
| *H04W 72/04* | (2009.01) | |
| *H04W 84/04* | (2009.01) | |
| *H04W 88/02* | (2009.01) | |
| *H04W 88/08* | (2009.01) | |
| *H04W 92/10* | (2009.01) | |

(52) U.S. Cl.
CPC ............. *H04B 7/086* (2013.01); *H04B 7/088* (2013.01); *H04B 7/0862* (2013.01); *H04B 17/336* (2015.01); *H04B 17/345* (2015.01); *H04J 11/0036* (2013.01); *H04J 11/0066* (2013.01); *H04J 11/0079* (2013.01); *H04L 5/005* (2013.01); *H04L 5/0053* (2013.01); *H04L 5/0073* (2013.01); *H04W 24/10* (2013.01); *H04W 52/243* (2013.01); *H04W 52/42* (2013.01); *H04W 56/001* (2013.01); *H04W 72/042* (2013.01); *H04W 72/046* (2013.01); *H04W 84/04* (2013.01); *H04W 88/02* (2013.01); *H04W 88/08* (2013.01); *H04W 92/10* (2013.01)

(58) Field of Classification Search
CPC ...... H04J 2011/0003–0096; H04L 5/0001–26; H04W 8/22–245; H04W 16/14–32; H04W 24/02–10; H04W 36/24–30; H04W 52/04–60; H04W 56/0005–0095; H04W 72/005–14; H04W 74/002–0891; H04W 84/02; H04W 84/04–047; H04W 88/02; H04W 88/04–12; H04W 92/02; H04W 92/04; H04W 92/10; H04W 92/12; H04W 92/16–24
See application file for complete search history.

(56) References Cited

OTHER PUBLICATIONS

Written Opinion of the International Searching Authority dated Nov. 25, 2019, issued in International Application No. PCT/EP2019/057789 (10 pages).

* cited by examiner

BEAMFORMED RECEPTION OF DOWNLINK REFERENCE SIGNALS

CROSS REFERENCE TO RELATED APPLICATION(S)

This application is a 35 U.S.C. § 371 National Stage of International Patent Application No. PCT/EP2019/057789, filed Mar. 27, 2019, designating the United States.

TECHNICAL FIELD

Embodiments presented herein relate to a method, a terminal device, a computer program, and a computer program product for beamformed reception of downlink reference signals. Embodiments presented herein further relate to a method, a network node, a computer program, and a computer program product for configuring the terminal device for beamformed reception of downlink reference signals.

BACKGROUND

In communications networks, there may be a challenge to obtain good performance and capacity for a given communications protocol, its parameters and the physical environment in which the communications network is deployed.

For example, for future generations of mobile communications networks, frequency bands at many different carrier frequencies could be needed. For example, low such frequency bands could be needed to achieve sufficient network coverage for wireless devices and higher frequency bands (e.g. at millimeter wavelengths (mmW), i.e. near and above 30 GHz) could be needed to reach required network capacity. In general terms, at high frequencies the propagation properties of the radio channel are more challenging and beamforming both at the network node of the network and at the wireless devices might be required to reach a sufficient link budget.

Narrow beam transmission and reception schemes might be needed at such high frequencies to compensate the expected high propagation loss. For a given communication link, a respective beam can be applied at both the network-end (as represented by a network node or its transmission and reception point, TRP) and at the terminal-end (as represented by a terminal device), which typically is referred to as a beam pair link (BPL). One task of the beam management procedure is to discover and maintain beam pair links. A BPL (i.e. both the beam used by the network node and the beam used by the terminal device) is expected to be discovered and monitored by the network using measurements on downlink reference signals, such as channel state information reference signals (CSI-RS) or synchronization signal block (SSB) signals, used for beam management.

The CSI-RS for beam management can be transmitted periodically, semi-persistently or aperiodically (event triggered) and they can be either shared between multiple terminal devices or be device-specific. The SSB are transmitted periodically and are shared for all terminal devices. In order for the terminal device to find a suitable network node beam, the network node transmits the reference signal in different transmission (TX) beams on which the terminal device performs measurements, such as reference signal received power (RSRP), and reports back the M best TX beams (where M can be configured by the network). Furthermore, the transmission of the reference signal on a given TX beam can be repeated to allow the terminal device to evaluate a suitable reception (RX) beam. Reference signals that are shared between all terminal devices served by the TRP might be used to determine a first coarse direction for the terminal devices. It could be suitable for such a periodic TX beam sweep at the TRP to use SSB as the reference signal. One reason for this is that SSB are anyway transmitted periodically (for initial access/synchronization purposes) and SSBs are also expected to be beamformed at higher frequencies to overcome the higher propagation losses noted above.

However, the terminal device might experience interference from other TRPs when receiving the CSI-RS which means that the best BPL based on RSRP might be sub-optimal user throughput. Therefore, in scenarios where the terminal device is forced to report back the M best TX beams based on RSRP, the TX beam(s) indicated from the terminal device might be sub-optimal. It has therefore been proposed that the terminal device should be able to report back best TX beam(s) based on signal to interference plus noise ratio (SINR). However, this would result in that the same TX beam(s) as when basing the report on RSRP is/are reported, since the terminal device uses a fixed beam during this beam sweep procedure and the interference therefore is the same for all TX beams.

Hence, there is still a need for improved beam sweep procedures.

SUMMARY

An object of embodiments herein is to provide an efficient beam sweep procedure that does not suffer from the issues noted above, or at least where the issues noted above are mitigated or reduced.

According to a first aspect there is presented a method for beamformed reception of downlink reference signals. The method is performed by a terminal device. The method comprises obtaining direction-wise measurements of interference experienced by the terminal device. The method comprises generating, based on the direction-wise measurements of interference, a beam having a beam gain that is lower in those directions where a first interference level is experienced than in those directions where a second interference level is experienced, where the first interference level is higher than the second interference level. The method comprises receiving, using the generated beam, downlink reference signals from a network node.

According to a second aspect there is presented a terminal device for beamformed reception of downlink reference signals. The terminal device comprises processing circuitry. The processing circuitry is configured to cause the terminal device to obtain direction-wise measurements of interference experienced by the terminal device. The processing circuitry is configured to cause the terminal device to generate, based on the direction-wise measurements of interference, a beam having a beam gain that is lower in those directions where a first interference level is experienced than in those directions where a second interference level is experienced, where the first interference level is higher than the second interference level. The processing circuitry is configured to cause the terminal device to receive, using the generated beam, downlink reference signals from a network node.

According to a third aspect there is presented a terminal device for beamformed reception of downlink reference signals. The terminal device comprises an obtain module configured to obtain direction-wise measurements of interference experienced by the terminal device. The terminal device comprises a generate module configured to generate, based on the direction-wise measurements of interference, a beam having a beam gain that is lower in those directions where a first interference level is experienced than in those directions where a second interference level is experienced, where the first interference level is higher than the second interference level. The terminal device comprises a receive module configured to receive, using the generated beam, downlink reference signals from a network node.

According to a fourth aspect there is presented a computer program for beamformed reception of downlink reference signals, the computer program comprises computer program code which, when run on processing circuitry of a terminal device, causes the terminal device to perform a method according to the first aspect.

According to a fifth aspect there is presented a method for configuring a terminal device for beamformed reception of downlink reference signals. The method is performed by a network node. The method comprises providing instructions to the terminal device for the terminal device to generate a beam based on interference experienced by the terminal device, where, according to the instructions, the beam is to have a beam gain in those directions where a first interference level is experienced that is lower than in those directions where a second interference level is experienced, where the first interference level is higher than the second interference level. The method comprises transmitting downlink reference signals in a set of beams.

According to a sixth aspect there is presented a network node for configuring a terminal device for beamformed reception of downlink reference signals. The network node comprises processing circuitry. The processing circuitry is configured to cause the network node to provide instructions to the terminal device for the terminal device to generate a beam based on interference experienced by the terminal device, where, according to the instructions, the beam is to have a beam gain in those directions where a first interference level is experienced that is lower than in those directions where a second interference level is experienced, where the first interference level is higher than the second interference level. The processing circuitry is configured to cause the network node to transmit downlink reference signals in a set of beams.

According to a seventh aspect there is presented a network node for configuring a terminal device for beamformed reception of downlink reference signals. The network node comprises a provide module configured to provide instructions to the terminal device for the terminal device to generate a beam based on interference experienced by the terminal device, where, according to the instructions, the beam is to have a beam gain in those directions where a first interference level is experienced that is lower than in those directions where a second interference level is experienced, where the first interference level is higher than the second interference level. The network node comprises a transmit module configured to transmit downlink reference signals in a set of beams.

According to an eight aspect there is presented a computer program for configuring a terminal device for beamformed reception of downlink reference signals, the computer program comprising computer program code which, when run on processing circuitry of a network node, causes the network node to perform a method according to the fifth aspect.

According to a ninth aspect there is presented a computer program product comprising a computer program according to at least one of the fourth aspect and the eight aspect and a computer readable storage medium on which the computer program is stored. The computer readable storage medium could be a non-transitory computer readable storage medium.

Advantageously these methods, these terminal devices, these network nodes, and these computer programs provide an efficient beam sweep procedure.

Advantageously these methods, these terminal devices, these network nodes, and these computer programs enable the best TX beam to, by the terminal device, be selected taking the interference experienced by the terminal device into account, which will improve the user throughput for the terminal device.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
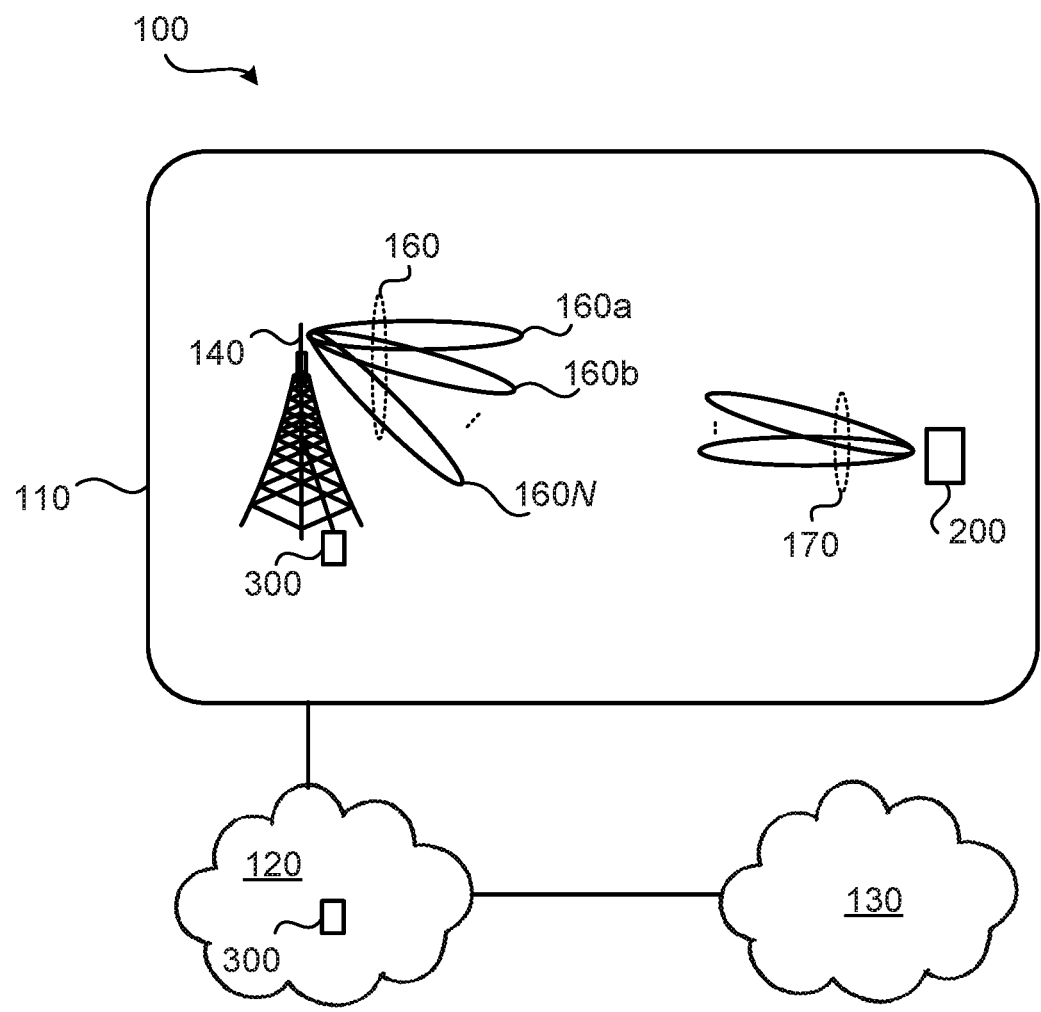
FIG. 1 is a schematic diagram illustrating a communication network according to embodiments.

FIG. 1 is a schematic diagram illustrating a communication network 100 where embodiments presented herein can be applied. The communication network 100 could be a third generation (3G) telecommunications network, a fourth generation (4G) telecommunications network, or a fifth (5G) telecommunications network and support any 3GPP telecommunications standard, where applicable.

The communication network 100 comprises a network node 300 configured to, vi a TRP 140, provide network access to at least one terminal device 200 in a radio access network 110. The radio access network 110 is operatively connected to a core network 120. The core network 120 is in turn operatively connected to a service network 130, such as the Internet. The terminal device 200 is thereby enabled to, via the network node 300, access services of, and exchange data with, the service network 130. The network node 140 (via its TRP 150) and the terminal device 200 are be configured to communicate with each other in respective sets of beams 160, 170.

Examples of network nodes 200 are radio access network nodes, radio base stations, base transceiver stations, Node Bs, evolved Node Bs, gNBs, access points, and access nodes, and backhaul nodes. Examples of terminal devices 300 are wireless devices, mobile stations, mobile phones, handsets, wireless local loop phones, user equipment (UE), smartphones, laptop computers, tablet computers, network equipped sensors, network equipped vehicles, and so-called Internet of Things devices.

As disclosed above there is a need for improved beam sweep procedures.

The embodiments disclosed herein therefore in particular relate to mechanisms for beamformed reception of downlink reference signals and configuring a terminal device 200 for beamformed reception of downlink reference signals. In order to obtain such mechanisms there is provided a terminal device 200, a method performed by the terminal device 200, a computer program product comprising code, for example in the form of a computer program, that when run on processing circuitry of the terminal device 200, causes the terminal device 200 to perform the method. In order to obtain such mechanisms there is further provided a network node 300, a method performed by the network node 300, and a computer program product comprising code, for example in the form of a computer program, that when run on processing circuitry of the network node 300, causes the network node 300 to perform the method.

Figure 2:
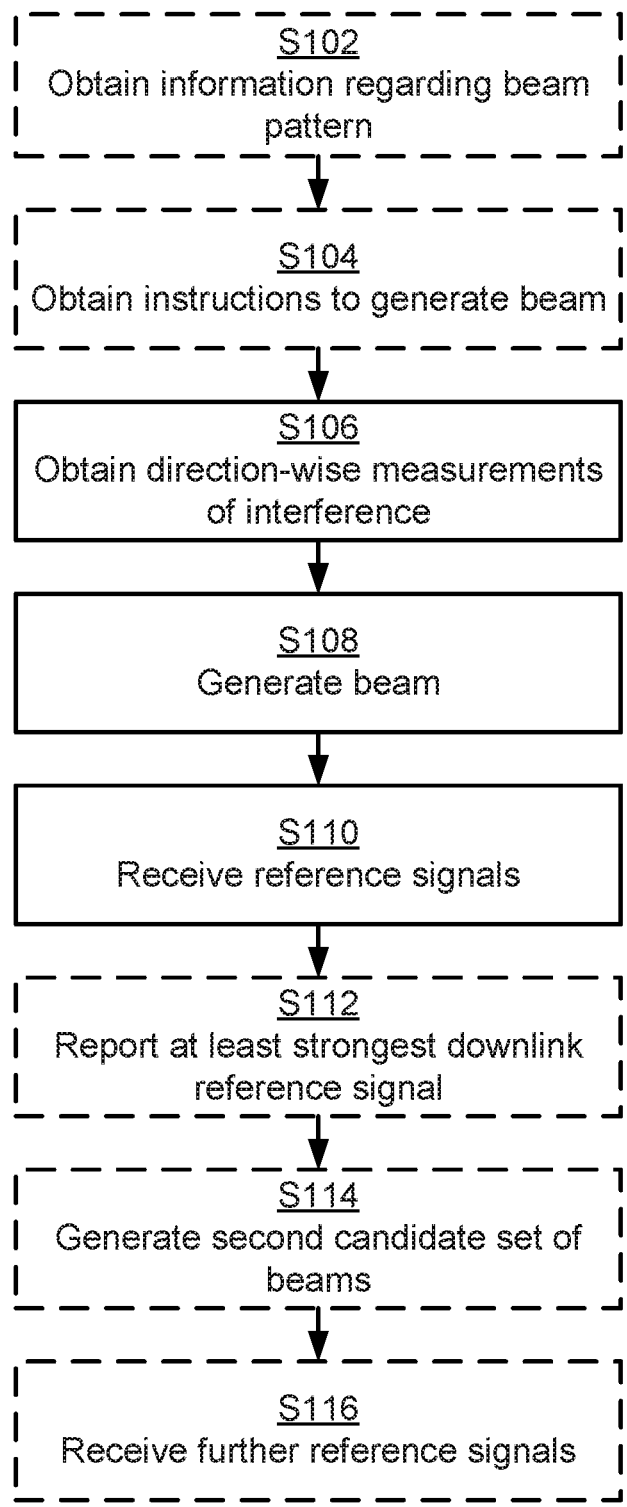
FIGS. 2 and 3 are flowcharts of methods according to embodiments.

Reference is now made to FIG. 2 illustrating a method for beamformed reception of downlink reference signals as performed by the terminal device 200 according to an embodiment.

The terminal device 200 obtains a priori measurements of interference in different directions. These measurements are therefore denoted direction-wise measurements of interference. Hence, the terminal device 200 is configured to perform step S106:

S106: The terminal device 200 obtains direction-wise measurements of interference experienced by the terminal device 200.

During a beam sweep as performed by the network node 200, instead of the terminal device 200 using as wide beam for reception as possible, the terminal device 200 uses a beam that reflects the a priori measurements of interference. The terminal device 200 therefore generates a beam conditioned on the a priori measurements of interference in order to reduce the beam gain in directions where the interference is comparatively strong. In particular, the terminal device 200 is configured to perform step S108:

S108: The terminal device 200 generates, based on the direction-wise measurements of interference, a beam. The beam has a beam gain that is lower in those directions where a first interference level is experienced than in those directions where a second interference level is experienced. The first interference level is higher than the second interference level. The first interference level will hereinafter be referred to as strong interference.

The generated beam is then used for reception. In particular, the terminal device 200 is configured to perform step S110:

S110: The terminal device 200 receives, using the generated beam, downlink reference signals from the network node 300.

In some aspects the downlink reference signals are received during a P2 beam sweep procedure performed by the network node 300. The terminal device 200 is thereby enabled to report back the best beam of the network node 300 based on RSRP, which is not received in the same direction as the strong interference. This implies that the beam used by the network node 300 will by the terminal device 200 not only be selected based on RSRP but also taking interference experienced by the terminal device 200 into account.

Figure 3:
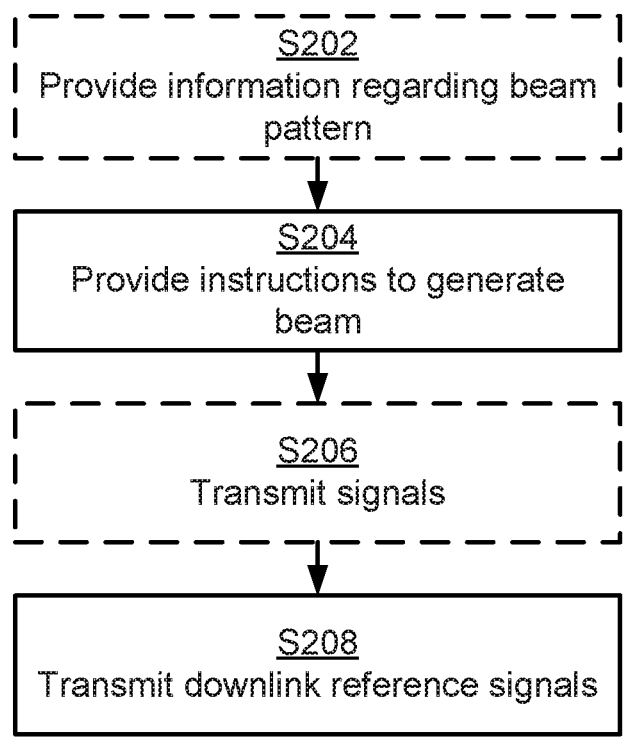
Figure 4:
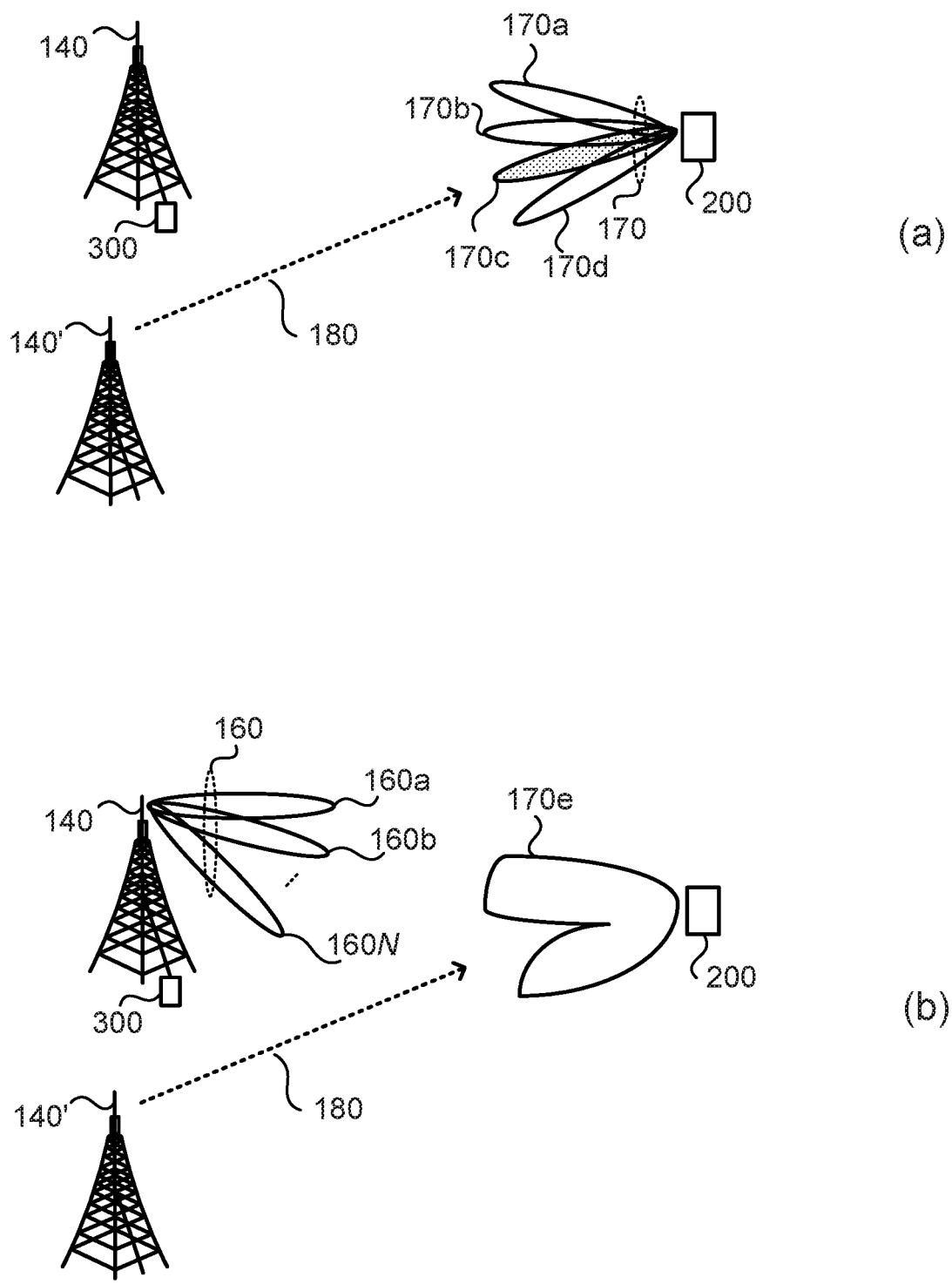
FIG. 4 is a schematic illustration of a scenario of a terminal device experiencing interference according to an embodiment.
Figure 4:
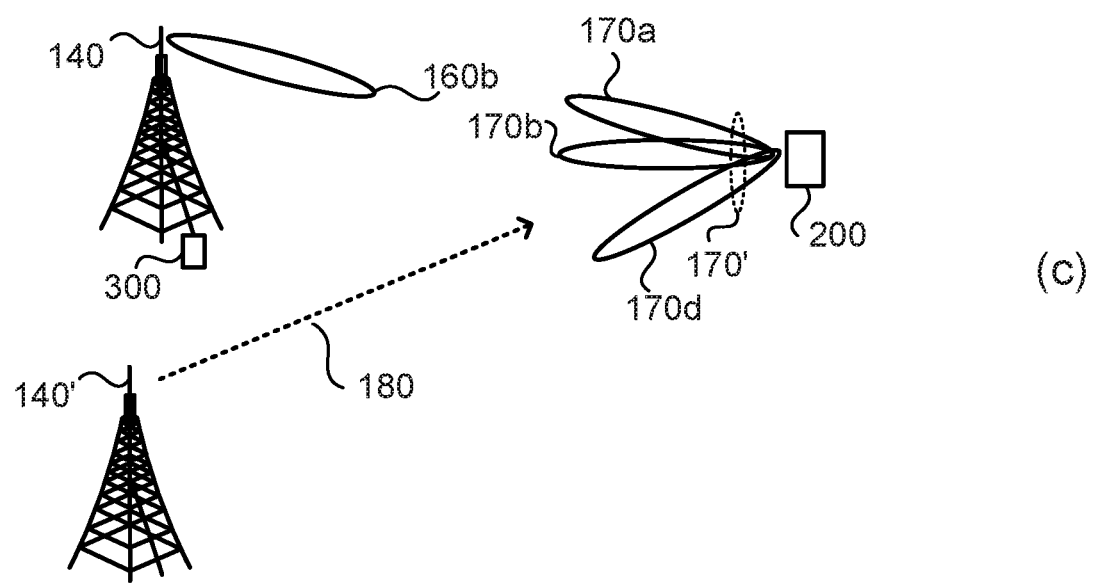

Embodiments relating to further details of beamformed reception of downlink reference signals as performed by the terminal device 200 will now be disclosed with continued reference to FIG. 3 and with parallel reference to FIG. 4. FIG. 4 schematically illustrates terminal device 200 as served by network node 300 and its TRP 140, where the terminal device 200 experienced interference 180 as caused by TRP 140'.

There may be different ways for the terminal device 200 to obtain the direction-wise measurements of interference as in S106. Different embodiments relating thereto will now be described in turn. In general terms, the measurements of interference might by the terminal device 200 be performed on all kinds of signals received by the terminal device 200 that enable the terminal device 200 to make an estimate of total received power.

In some aspects the direction-wise measurements of interference are obtained during a P3 beam sweep procedure. The terminal device 200 might, during the P3 beam sweep procedure, not only measure the RSRP from the CSI-RS transmitted from the network node 200, but at the same time also measures interference as experienced in different receive beams of the terminal device 200. Particularly, according to an embodiment, the direction-wise measurements of interference are obtained by the terminal device 200 whilst performing a beam sweep using beams in a first candidate set of at least two directional beams. In FIG. 4(a) it is assumed that the first candidate set consists of beams 170a, 170b, 170c, 170d. In FIG. 4(a) it is further assumed that strong interference is experienced in beam 170c. The direction-wise measurements of interference are then indicative of interference per beam in the first candidate set of directional beams. For example, the terminal device 200 might estimate the interference level based on the residuals of the channel estimation by subtracting averaged channel estimates from raw channel estimates.

During the P3 beam sweep procedure the network node 300 might transmit either channel state information reference signals (CSI-RSs) or synchronization signal blocks (SSBs). Particularly, according to an embodiment, during the beam sweep, the terminal device 200 receives one CSI-RS, or one SSB per beam. The direction-wise measurements of interference might then be based on measurements of the CSI-RSs or SSBs received in different beams during the beam sweep.

In some aspects the terminal device 200 obtains information from the network node 300 about its beam pattern. In more detail, the network node 300 might control its transmission in such a way as to allow the terminal device 200 to determine in which receive beams strong interference is experienced. In some aspects the network node 300 therefore informs the terminal device 200 about its beam pattern for transmission and/or instructs the terminal device 200 to perform certain measurements. Particularly, according to an embodiment, the terminal device 200 is configured to perform (optional) step S102:

S102: The terminal device 200 obtains information from the network node 300 regarding which beam pattern the network node 300 is to use for transmission of signals when the terminal device 200 performs the beam sweep.

To reduce the difference in channel estimation error across different receive beams at the terminal device 200, it may be beneficial to determine the interference level based on residuals of a reference signal transmitted in a wide beam. Therefore, the information in S102 might specify that the network node 300 intends to apply a wide beam on the multiple CSI-RS or SSB transmissions constituting the P3 beam sweep procedure.

There could be different ways to provide the information in S102. Particularly, according to an embodiment, the information is provided as channel state information (CSI) report configuration. For example, the information might be provided as CSI report configuration in a new information element (IE). In further detail, the information may be conveyed as a new parameter included in the IE NZP-CSI-RS-ResourceSet, or alternatively, in the RRC field repetition (which indicates that the precoding on all CSI-RS resources in the CSI-RS resource set is the same and hence allows the terminal device 200 to perform a P3 beam sweep procedure) comprised in the IE NZP-CSIRS-ResourceSet extended with a new state "on-wide".

In further aspects the direction-wise measurements of interference are obtained when the terminal device 200 receives data. Particularly, according to an embodiment, the direction-wise measurements of interference are obtained during downlink reception of data by the terminal device 200. By logging information about previous downlink data reception the terminal device 200 might detect if, for example, one or more certain reception beam at the terminal device 200 experiences strong interference, which, for example, had a strong negative impact of the experienced user throughput. Further, in case the terminal device 200 is rather position-wise stationary, statistics over the interference measurements can be averaged over longer time.

In yet further aspects the direction-wise measurements of interference are obtained when the terminal device 200 is not scheduled to receive signals from the network node 300 (e.g. when the network node 300 is silent). Particularly, according to an embodiment, the direction-wise measurements of interference are obtained when the terminal device 200 neither is scheduled to receive data nor scheduled to receive reference signals or control signals from the network node 300. The network node 300 might therefore inform the terminal device 200 that the network node 300 does not intend to transmit any signal for a number of symbols (or slots, sub-frames, or frames), allowing the terminal device 200 to perform beam sweep capturing only interference. In this case, since there is no reference signal (or other signal or physical channel) transmitted from the network node 300, the terminal device 200 cannot perform measurements of RSRP and might instead perform measurements of Received Signal Strength Indicator (RSSI), simply measuring the linear average of the received transmission power over the resource elements in the symbol or symbols over which the measurements are performed.

The information that the network node 300 does not intend to transmit any signal for a number of symbols (or slots, sub-frames, or frames) may be conveyed to the terminal device 200 for example as a configuration of a measurement gap, but where the terminal device 200 is not instructed to perform an inter-frequency or inter-RAT measurement (where RAT is short for radio access technology). Alternatively, the network node 300 might configure certain resources as reserved, similarly as for reserved resources for LTE-NR coexistence. Yet another option is for the network node 300 to configure the symbols with zero-power (ZP) CSI-RS resources. Yet another option is for the network node 300 to explicitly indicate that certain symbols are to be used by the terminal device 200 for interference measurements.

In some aspects the network node 300 instructs the terminal device 200 to generate a beam based on interference. Particularly, according to an embodiment, the terminal device 200 is configured to perform (optional) step S104:

S104: The terminal device 200 obtains instructions from the network node 300 for the terminal device 200 to generate the beam based on interference experienced by the terminal device 200.

Non-limiting examples of how the terminal device 200 might generate the beam in S108 will now be disclosed. In FIG. 4(b) the generated beam is illustrated at reference numeral 170e.

There could be other conditions on the beam generated in S108 in addition to having a beam gain that is lower in those directions where a first interference level is experienced than in those directions where a second interference level is experienced. For example, one such condition might be that the beam 170e generated in S108 is as wide as possible. Particularly, according to an embodiment, the generated beam is by the terminal device 200 generated to be as wide as possible. Hence, the beam might in S108 be generated to be as wide as possible but with suppressed gain in directions of strong interference. In FIG. 4(b) the beam 170e is suppressed in the direction corresponding to beam 170c in which strong interference was experienced.

For example, as disclosed above, the terminal device 200 might perform a beam sweep using beams in a first candidate set of at least two directional beams. Then, according to an example, the beams in a first candidate set are described by a set of receiver beam vectors $\{f_0, f_1, \ldots, f_{N-1}\} = \{f_i\}_{i=0}^{N-1}$, which for instance might constitute orthogonal Discrete Fourier Transform (DFT) vectors. Based on measurements using the beams in a first candidate set as disclosed above, the terminal device 200 is for illustrative purposes assumed to have determined an interference level $P_i$ associated with each receiver beam i in the first candidate set. If the N beam vectors in the set constitute an orthogonal (and optionally rotated) DFT basis and the antenna panel of the terminal device 200 can be described as a uniform linear array (ULA), the average of the receiver beam vectors in the set $f_{AVG}=\Sigma_{i=0}^{N-1}f_i$ have a wide beam characteristic. One way to generate the beam in S108 with suppressed gain in directions of strong interference is then be to weight the receiver beam vector in the sum with the inverse of the associated interference level, i.e. $f_{wide,sup}=\Sigma_{i=0}^{N-1}1/P_if_i^o$. Particularly, according to an embodiment, the first candidate set of at least two directional beams is defined by a first set of beam vectors. The generated beam might then be generated from the first candidate set of at least two directional beams by weighting the first set of beam vectors according to the interference per beam in the first candidate set of directional beams. In other words, the more interference the beam experiences, the less weight (i.e., the smaller the magnitude of the weight) it should have. In another non-limiting example, a simplified interference rejection combining (IRC) receiver vector may be constructed by selecting a set of $N_k$ receiver filter vectors $\{g_k\}_{k=0}^{N_k-1}$ as a subset of receiver beam vectors in which strong interference is experienced. The desired receive beam vector might then be determined as $f_{wide,IRC}=(I+\Sigma_{k=0}^{N_k-1}g_k)^{-1}f_{wide}$, where $f_{wide}$ is a wide receiver beam vector.

As disclosed above, the terminal devices receives, using the generated beam 170e, downlink reference signals from the network node 300. In FIG. 4(b) the downlink reference signals are transmitted in beams 160a, 160b, . . . 160N. In some aspects the terminal device 200 provides feedback to the network node 300 about measurements made on the downlink reference signals received in the beam from the network node 300 in S110. Particularly, according to an embodiment, the terminal device 200 is configured to perform (optional) step S112:

S112: The terminal device 200 reports to the network node 300 at least the downlink reference signal having been received with highest power by the terminal device 200 in the beam generated in S108.

The terminal device 200 is thereby enabled to select and report the strongest beams used by the TRP which are not received in the directions of the strong interference. In FIG. 4(b) it is assumed that the reference signal for which the RSRP is highest, and thus reported in S112, is transmitted in beam 160b.

In some aspects it is assumed that the network node 300 is to perform a P3 beam sweep procedure that enables the terminal device 200 to find its optimal receive beam for the beam identified by the at least the downlink reference signal having been received with highest power by the terminal device 200 as reported by the terminal device 200 in S112. The terminal device 200 might therefore generate a candidate beam set to be used during P3 beam sweep procedure based on the beam generated in S108. It is assumed that the generated beam has a footprint defined by its direction-wise beam gain. Then, according to an embodiment, the terminal device 200 is configured to perform (optional) step S114:

S114: The terminal device 200 generates a second candidate set of at least two beams based on the footprint of the generated beam.

In some examples all beams of the second candidate set of at least two beams collectively span the footprint of the generated beam. The terminal device 200 might thus generate a second candidate set of beams where none of the beams is pointing in the direction of the strong interference, or at least where the beam gain of the beams pointing in the direction of the strong interference is reduced compared to the beam gain of the other beams. In this way the relevant angular interval of the beams might be more densely sampled by the beams in the second candidate set of beams, which means that straddling loss for the beam selection might be reduced.

In some aspects the second candidate set of at least two beams is based on the first candidate set of at least two beams where the beams in the first candidate set pointing in directions of strong interference have been removed, or at least where the beam gain of the beams pointing in the direction of the strong interference is reduced compared to the beam gain of the other beams. In FIG. 4(c) the second candidate set is identified at reference numeral 170' and consists of beams 170a, 170b, and 170d.

The second candidate set of at least two beams might then be used by the terminal device 200 during the P3 beam sweep procedure in order for the terminal device 200 to determine which beam to use for future data reception and/or transmission from/to the network node 300. Particularly, according to an embodiment, the terminal device 200 is configured to perform (optional) step S116:

S116: The terminal device 200 receives further downlink reference signals from the network node 300 whilst performing a beam sweep using the beams in the second candidate set of at least two directional beams.

In FIG. 4(c) the further downlink reference signals are transmitted in beam 160b and received in beams 170a, 170b, and 170d.

Aspects of the interference will now be disclosed. There might be different types of interference that the terminal device 200 experiences. According to a first example, the interference is inter-cell interference. According to a second example, the interference is intra-cell interference.

Reference is now made to FIG. 3 illustrating a method for configuring a terminal device 200 for beamformed reception of downlink reference signals as performed by the network node 300 according to an embodiment.

S204: The network node 300 provides instructions to the terminal device 200 for the terminal device 200 to generate a beam based on interference experienced by the terminal device 200. According to the instructions, the beam is to have a beam gain in those directions where a first interference level is experienced that is lower than in those directions where a second interference level is experienced. The first interference level is higher than the second interference level.

S208: The network node 300 transmits downlink reference signals in a set of beams.

Embodiments relating to further details of configuring a terminal device 200 for beamformed reception of downlink reference signals as performed by the network node 300 will now be disclosed.

As disclosed above, the network node 300 might inform the terminal device 200 of which beam pattern the network node 300 is to use for transmission of signals. Particularly, according to an embodiment the instructions in S204 specifies that the beam is to be generated based on direction-wise measurements of interference experienced by the terminal device 200. As disclosed above, the direction-wise measurements of interference might then be obtained by the terminal device 200 by performing a beam sweep in a first candidate set of at least two beams. According to this embodiment the network node 300 is configured to perform (optional) steps S202 and S206:

S202: The network node 300 provides information to the terminal device 200 regarding which beam pattern the network node 300 is to use for transmission of signals when the terminal device 200 performs the beam sweep.

S206: The network node 300 transmits the signals according to the beam pattern.

As disclosed above, the information regarding which beam pattern the network node 300 is to use might be provided as CSI report configuration.

As disclosed above, the signals transmitted by the network node 300 according to the beam pattern might be CSI-RSs or SSBs.

Figure 5:
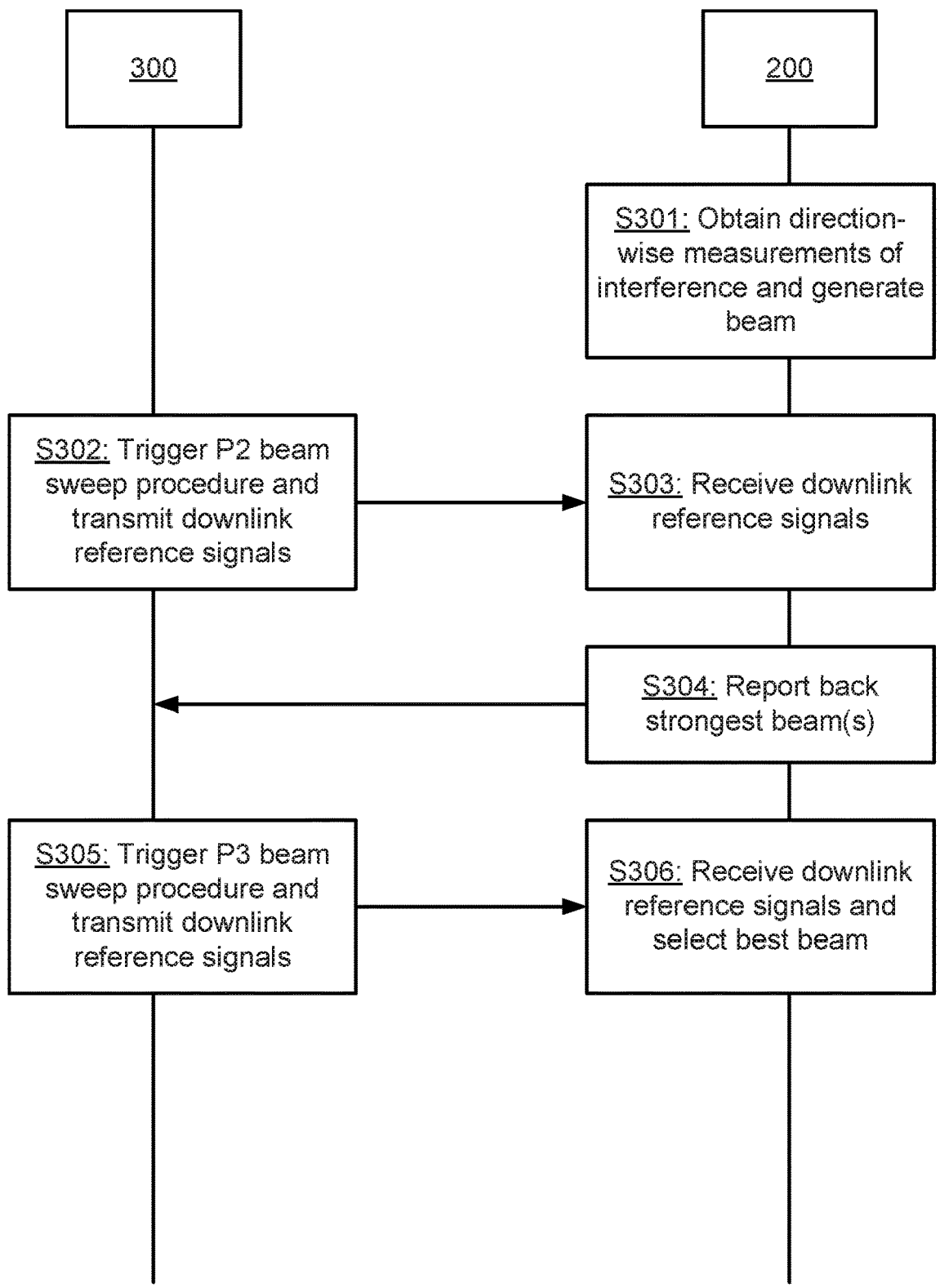
FIG. 5 is a signalling diagram of a method according to an embodiment.

One particular embodiment for beamformed reception of downlink reference signals based on at least some of the above disclosed embodiments will now be disclosed in detail with reference to the signalling diagram of FIG. 5.

S301: The terminal device 200 obtains direction-wise measurements of interference experienced by the terminal device 200 in order to evaluate whether or not there are any directions from where the terminal device 200 experiences strong interference.

S302: The network node 300 triggers a P2 beam sweep procedure and transmits downlink reference signals, such as CSI-RSs or SSBs, in beams according to the P2 beam sweep procedure.

S303: The terminal device 200 receives the downlink reference signals in a beam generated based on the direction-wise measurements of interference. The beam has a beam gain that is lower in those directions where a first interference level is experienced than in those directions where a second interference level is experienced, where the first interference level is higher than the second interference level.

S304: The terminal device 200 reports to the network node 300 at least the downlink reference signal having been received with highest power by the terminal device 200.

S305: The network node 300 triggers a P3 beam sweep procedure and transmits further downlink reference signals, such as CSI-RSs or SSBs, in a beam according to the P3 beam sweep procedure.

S306: The terminal device 200 receives the further downlink reference signals in a second candidate set of at least two beams, where the second candidate set is based on the footprint of the beam used in S303. The terminal device 200 might then select the beam in second candidate set in which the further downlink reference signal was received with highest RSRP to be used for future reception and/or transmission.

Figure 6:
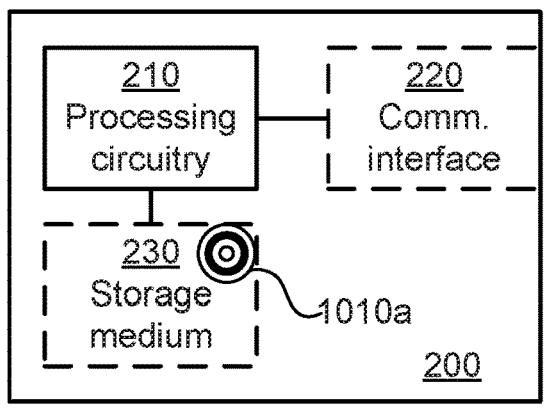
FIG. 6 is a schematic diagram showing functional units of a terminal device according to an embodiment.

FIG. 6 schematically rates, in terms of a number of functional units, the components of a terminal device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1010a (as in FIG. 10), e.g. in the form of a storage medium 230. The processing circuitry 210 may further be provided as at least one application specific integrated circuit (ASIC), or field programmable gate array (FPGA).

Particularly, the processing circuitry 210 is configured to cause the terminal device 200 to perform a set of operations, or steps, as disclosed above. For example, the storage medium 230 may store the set of operations, and the processing circuitry 210 may be configured to retrieve the set of operations from the storage medium 230 to cause the terminal device 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The terminal device 200 may further comprise a communications interface 220 for communications with other entities, nodes, functions, and devices of the communication network 100 of FIG. 1. As such the communications interface 220 may comprise one or more transmitters and receivers, comprising analogue and digital components.

The processing circuitry 210 controls the general operation of the terminal device 200 e.g. by sending data and control signals to the communications interface 220 and the storage medium 230, by receiving data and reports from the communications interface 220, and by retrieving data and instructions from the storage medium 230. Other components, as well as the related functionality, of the terminal device 200 are omitted in order not to obscure the concepts presented herein.

Figure 7:
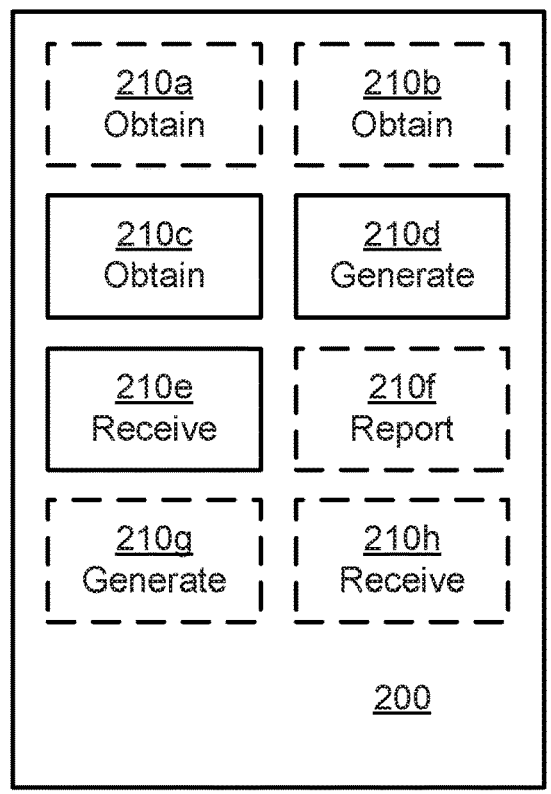
FIG. 7 is a schematic diagram showing functional modules of a terminal device according to an embodiment.

FIG. 7 schematically illustrates, in terms of a number of functional modules, the components of a terminal device 200 according to an embodiment. The terminal device 200 of FIG. 7 comprises a number of functional modules; an obtain module 210c configured to perform step S106, a generate module 210d configured to perform step S108, and a receive module 210e configured to perform step S110. The terminal device 200 of FIG. 7 may further comprise a number of optional functional modules, such as any of an obtain module 210a configured to perform step S102, a obtain module 210b configured to perform step S104, a report module 210f configured to perform step S112, a generate module 210g configured to perform step S114, and a receive module 210h configured to perform step S116.

In general terms, each functional module 210a-210h may be implemented in hardware or in software. Preferably, one or more or all functional modules 210a-210h may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210h and to execute these instructions, thereby performing any steps of the terminal device 200 as disclosed herein.

Figure 8:
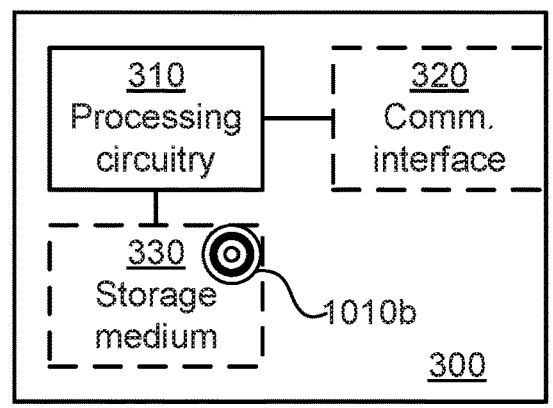
FIG. 8 is a schematic diagram showing functional units of a network node according to an embodiment.

FIG. 8 schematically illustrates, in terms of a number of functional units, the components of a network node 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product bomb (as in FIG. 10), e.g. in the form of a storage medium 330. The processing circuitry 310 may further be provided as at least one application specific integrated circuit (ASIC), or field programmable gate array (FPGA).

Particularly, the processing circuitry 310 is configured to cause the network node 300 to perform a set of operations, or steps, as disclosed above. For example, the storage medium 330 may store the set of operations, and the processing circuitry 310 may be configured to retrieve the set of operations from the storage medium 330 to cause the network node 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The network node 300 may further comprise a communications interface 320 for communications with entities, nodes, functions, and devices of the communication network 100 of FIG. 1. As such the communications interface 320 may comprise one or more transmitters and receivers, comprising analogue and digital components.

The processing circuitry 310 controls the general operation of the network node 300 e.g. by sending data and control signals to the communications interface 320 and the storage medium 330, by receiving data and reports from the communications interface 320, and by retrieving data and instructions from the storage medium 330. Other components, as well as the related functionality, of the network node 300 are omitted in order not to obscure the concepts presented herein.

Figure 9:
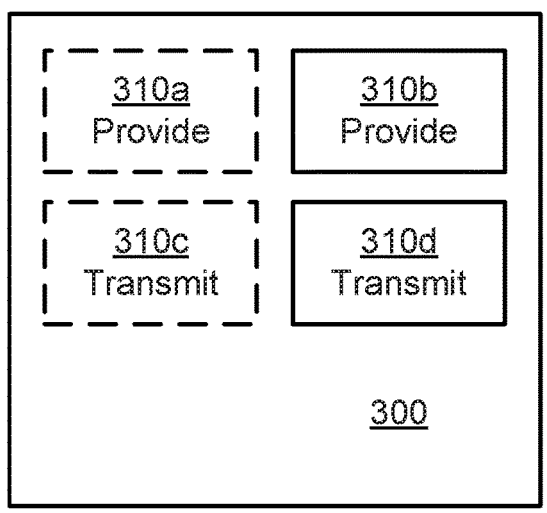
FIG. 9 is a schematic diagram showing functional modules of a network node according to an embodiment.

FIG. 9 schematically illustrates, in terms of a number of functional modules, the components of a network node 300 according to an embodiment. The network node 300 of FIG. 9 comprises a number of functional modules; a provide module 310b configured to perform step S204, and a transmit module 310d configured to perform step S208. The network node 300 of FIG. 9 may further comprise a number of optional functional modules, such as any of a provide module 310a configured to perform step S202, and a transmit module 310c configured to perform step S206. In general terms, each functional module 310a-310d may be implemented in hardware or in software. Preferably, one or more or all functional modules 310a-310d may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310d and to execute these instructions, thereby performing any steps of the network node 300 as disclosed herein.

The network node 300 may be provided as a standalone device or as a part of at least one further device. For example, the network node 300 may be provided in a node of the radio access network 110 or in a node of the core network 120. Alternatively, functionality of the network node 300 may be distributed between at least two devices, or nodes. These at least two nodes, or devices, may either be part of the same network part (such as the radio access network 110 or the core network 120) or may be spread between at least two such network parts. In general terms, instructions that are required to be performed in real time may be performed in a device, or node, operatively closer to the cell than instructions that are not required to be performed in real time.

Thus, a first portion of the instructions performed by the network node 300 may be executed in a first device, and a second portion of the instructions performed by the network node 300 may be executed in a second device; the herein disclosed embodiments are not limited to any particular number of devices on which the instructions performed by the network node 300 may be executed. Hence, the methods according to the herein disclosed embodiments are suitable to be performed by a network node 300 residing in a cloud computational environment. Therefore, although a single processing circuitry 310 is illustrated in FIG. 8 the processing circuitry 310 may be distributed among a plurality of devices, or nodes. The same applies to the functional modules 310a-310d of FIG. 9 and the computer program 1020b of FIG. 10.

Figure 10:
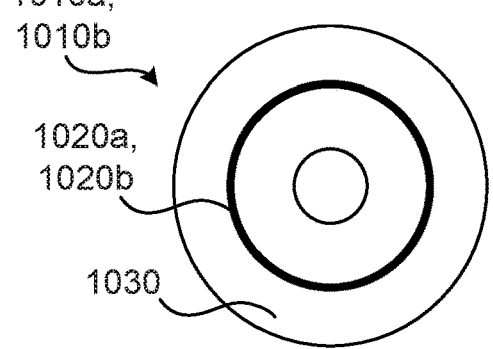
FIG. 10 shows one example of a computer program product comprising computer readable means according to an embodiment.

FIG. 10 shows one example of a computer program product 1010a, 1010b comprising computer readable means 1030. On this computer readable means 1030, a computer program 1020a can be stored, which computer program 1020a can cause the processing circuitry 210 and thereto operatively coupled entities and devices, such as the communications interface 220 and the storage medium 230, to execute methods according to embodiments described herein. The computer program 1020a and/or computer program product 1010a may thus provide means for performing any steps of the terminal device 200 as herein disclosed. On this computer readable means 1030, a computer program 1020b can be stored, which computer program 1020b can cause the processing circuitry 310 and thereto operatively coupled entities and devices, such as the communications interface 320 and the storage medium 330, to execute methods according to embodiments described herein. The computer program 1020b and/or computer program product 1010b may thus provide means for performing any steps of the network node 300 as herein disclosed.

In the example of FIG. 10, the computer program product 1010a, 1010b is illustrated as an optical disc, such as a CD (compact disc) or a DVD (digital versatile disc) or a Blu-Ray disc. The computer program product 1010a, 1010b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020a, 1020b is here schematically shown as a track on the depicted optical disk, the computer program 1020a, 1020b can be stored in any way which is suitable for the computer program product 1010a, 1010b.

Figure 11:
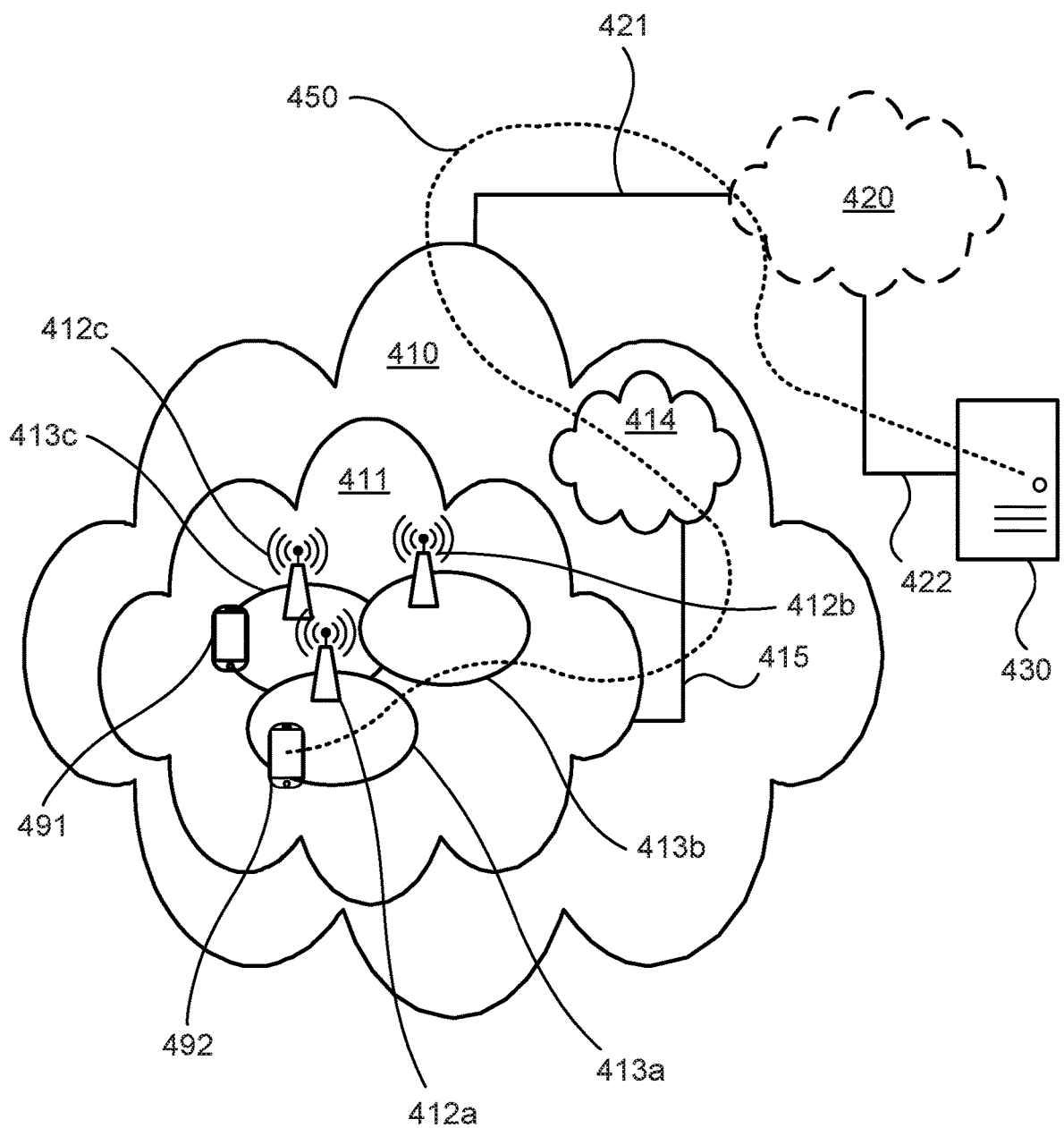
FIG. 11 is a schematic diagram illustrating a telecommunication network connected via an intermediate network to a host computer in accordance with some embodiments.

FIG. 11 is a schematic diagram illustrating a telecommunication network connected via an intermediate network 420 to a host computer 430 in accordance with some embodiments. In accordance with an embodiment, a communication system includes telecommunication network 410, such as a 3GPP-type cellular network, which comprises access network 411, such as radio access network 110 in FIG. 1, and core network 414, such as core network 120 in FIG. 1. Access network 411 comprises a plurality of radio access network nodes 412a, 412b, 412c, such as NBs, eNBs, gNBs (each corresponding to the network node 300 of FIG. 1) or other types of wireless access points, each defining a corresponding coverage area, or cell, 413a, 413b, 413c. Each radio access network nodes 412a, 412b, 412c is connectable to core network 414 over a wired or wireless connection 415. A first UE 491 located in coverage area 413c is configured to wirelessly connect to, or be paged by, the corresponding network node 412c. A second UE 492 in coverage area 413a is wirelessly connectable to the corresponding network node 412a. While a plurality of UE 491, 492 are illustrated in this example, the disclosed embodiments are equally applicable to a situation where a sole UE is in the coverage area or where a sole terminal device is connecting to the corresponding network node 412. The UEs 491, 492 correspond to the terminal device 200 of FIG. 1.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 11 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, network node 412 may not or need not be informed about the past routing of an incoming downlink communication with data originating from host computer 430 to be forwarded (e.g., handed over) to a connected UE 491. Similarly, network node 412 need not be aware of the future routing of an outgoing uplink communication originating from the UE 491 towards the host computer 430.

Figure 12:
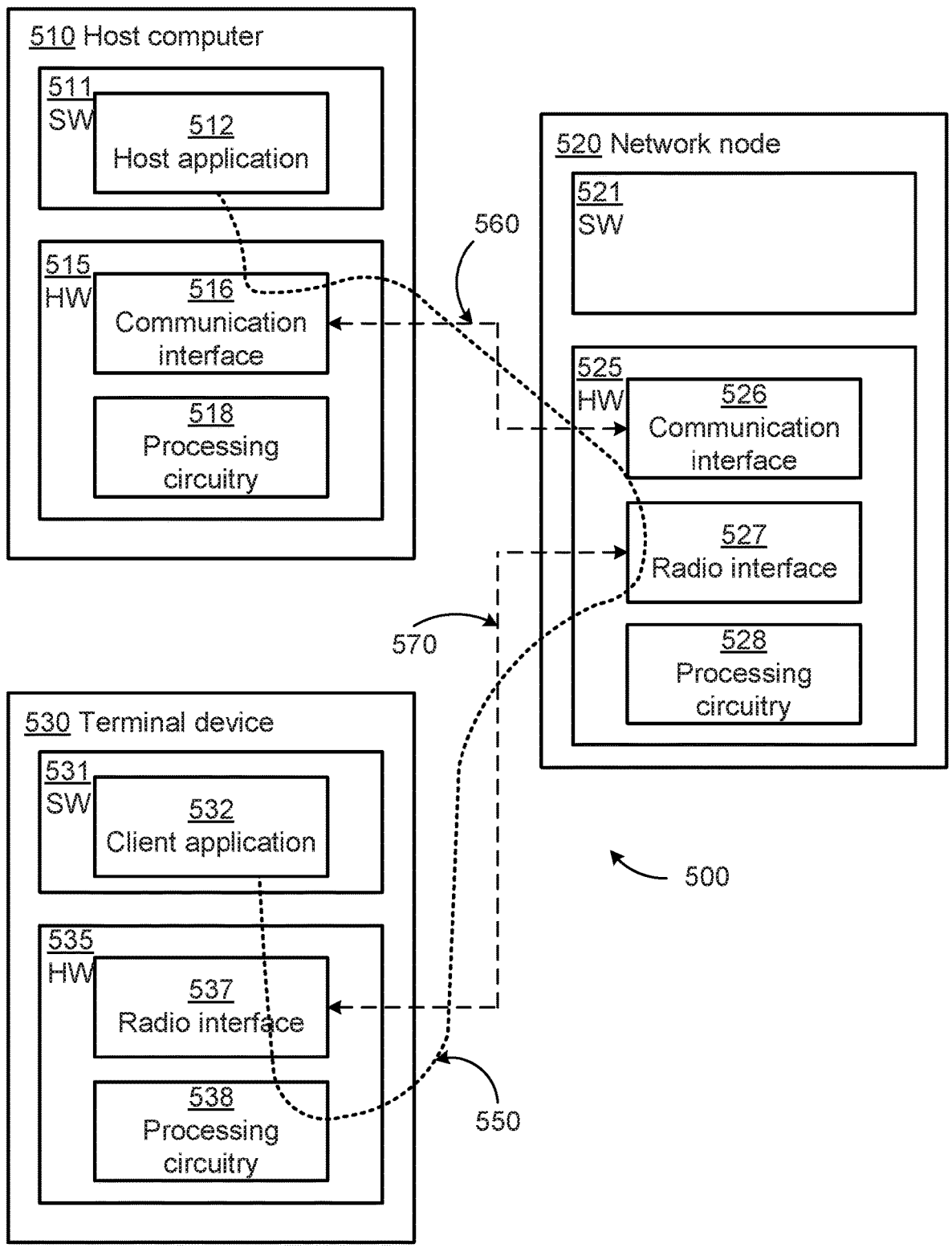
FIG. 12 is a schematic diagram illustrating host computer communicating via a radio base station with a terminal device over a partially wireless connection in accordance with some embodiments.

FIG. 12 is a schematic diagram illustrating host computer communicating via a radio access network node with a UE over a partially wireless connection in accordance with some embodiments. Example implementations, in accordance with an embodiment, of the UE, radio access network node and host computer discussed in the preceding paragraphs will now be described with reference to FIG. 12. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. The UE 530 corresponds to the terminal device 200 of FIG. 1. In providing the service to the remote user, host application 512 may provide user data which is transmitted using OTT connection 550.

Communication system 500 further includes radio access network node 520 provided in a telecommunication system and comprising hardware 525 enabling it to communicate with host computer 510 and with UE 530. The radio access network node 520 corresponds to the network node 300 of FIG. 1. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 12) served by radio access network node 520. Communication interface 526 may be configured to facilitate connection 560 to host computer 510. Connection 560 may be direct or it may pass through a core network (not shown in FIG. 12) of the telecommunication system and/or through one or more intermediate networks outside the telecommunication system. In the embodiment shown, hardware 525 of radio access network node 520 further includes processing circuitry 528, which may comprise one or more programmable processors, application-specific integrated circuits, field programmable gate arrays or combinations of these (not shown) adapted to execute instructions. Radio access network node 520 further has software 521 stored internally or accessible via an external connection.

Communication system 500 further includes UE 530 already referred to. Its hardware 535 may include radio interface 537 configured to set up and maintain wireless connection 570 with a radio access network node serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, radio access network node 520 and UE 530 illustrated in FIG. 12 may be similar or identical to host computer 430, one of network nodes 412a, 412b, 412c, and one of UEs 491, 492 of FIG. 11, respectively. This is to say, the inner workings of these entities may be as shown in FIG. 12 and independently, the surrounding network topology may be that of FIG. 11.

In FIG. 12, OTT connection 550 has been drawn abstractly to illustrate the communication between host computer 510 and LIE 530 via network node 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and radio access network node 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may reduce interference, due to improved classification ability of airborne UEs which can generate significant interference.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect network node 520, and it may be unknown or imperceptible to radio access network node 520. Such procedures and functionalities may be known and practiced in the art. In certain embodiments, measurements may involve proprietary UE signaling facilitating host computer's 510 measurements of throughput, propagation times, latency and the like. The measurements may be implemented in that software 511 and 531 causes messages to be transmitted, in particular empty or 'dummy' messages, using OTT connection 550 while it monitors propagation times, errors etc.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for beamformed reception of downlink reference signals, the method being performed by a terminal device, the method comprising:
 obtaining direction-wise measurements of interference experienced by the terminal device;
 generating, based on the direction-wise measurements of interference, a beam having a beam gain that is lower in those directions where a first interference level is experienced than in those directions where a second interference level is experienced, where the first interference level is higher than the second interference level; and
 receiving, using the generated beam, downlink reference signals from a network node.

2. The method of claim 1, further comprising:
 obtaining instructions from the network node for the terminal device to generate the beam based on interference experienced by the terminal device.

3. The method of claim 1, further comprising:
 reporting to the network node at least the downlink reference signal having been received with highest power by the terminal device.

4. The method of claim 1, wherein the direction-wise measurements of interference are obtained by the terminal device whilst performing a beam sweep using beams in a first candidate set of at least two directional beams, and wherein the direction-wise measurements of interference are indicative of interference per beam in the first candidate set of directional beams.

5. The method of claim 4, wherein, during the beam sweep, the terminal device receives one channel state information reference signal, CSI-RS, or one synchronization signal block, SSB, per beam, and wherein the direction-wise measurements of interference are based on measurements of the CSI or SSB.

6. The method of claim 4, further comprising:
 obtaining information from the network node regarding which beam pattern the network node is to use for transmission of signals when the terminal device performs the beam sweep, wherein
 the information is provided as channel state information report configuration.

7. The method of claim 4, wherein the first candidate set of at least two directional beams is defined by a first set of beam vectors, and wherein the generated beam is generated from the first candidate set of at least two directional beams by weighting the first set of beam vectors according to the interference per beam in the first candidate set of directional beams.

8. The method of claim 1, wherein the direction-wise measurements of interference are obtained when the terminal device neither is scheduled to receive data nor scheduled to receive reference signals or control signals from the network node.

9. The method of claim 1, wherein the direction-wise measurements of interference are obtained during downlink reception of data by the terminal device.

10. The method of claim 1, wherein the generated beam has a footprint defined by its direction-wise beam gain, the method further comprising:
 generating a second candidate set of at least two beams based on the footprint of the generated beam.

11. The method of claim 10, wherein all beams of the second candidate set of at least two beams collectively span the footprint of the generated beam.

12. The method of claim 10, further comprising:
 receiving further downlink reference signals from the network node whilst performing a beam sweep using the beams in the second candidate set of at least two directional beams.

13. A computer program product comprising a non-transitory computer readable medium storing computer code which, when run on processing circuitry of a terminal device, causes the terminal device to perform the method of claim 1.

14. A method for configuring a terminal device for beamformed reception of downlink reference signals, the method being performed by a network node, the method comprising:
 providing instructions to the terminal device for the terminal device to generate a beam based on interference experienced by the terminal device, where, according to the instructions, the beam is to have a beam gain in those directions where a first interference level is experienced that is lower than in those directions where a second interference level is experienced, where the first interference level is higher than the second interference level; and
 transmitting downlink reference signals in a set of beams.

15. The method of claim 14, wherein the instructions specifies that the beam is to be generated based on direction-wise measurements of interference experienced by the terminal device, the direction-wise measurements of interference being obtained by the terminal device by performing a beam sweep in a first candidate set of at least two beams, the method further comprising:

providing information to the terminal device regarding which beam pattern the network node is to use for transmission of signals when the terminal device performs the beam sweep; and transmitting the signals according to the beam pattern.

16. The method of claim 15, wherein the information is provided as channel state information report configuration.

17. The method of claim 15, wherein the signals are channel state information reference signals, or synchronization signal blocks.

18. A computer program product comprising a non-transitory computer readable medium storing computer code which, when run on processing circuitry of a network node causes the network node to perform the method of claim 14.

19. A terminal device for beamformed reception of downlink reference signals, the terminal device comprising processing circuitry, the processing circuitry being configured to cause the terminal device to:

obtain direction-wise measurements of interference experienced by the terminal device;

generate, based on the direction-wise measurements of interference, a beam having a beam gain that is lower in those directions where a first interference level is experienced than in those directions where a second interference level is experienced, where the first interference level is higher than the second interference level; and receive, using the generated beam, downlink reference signals from a network node.

20. A network node for configuring a terminal device for beamformed reception of downlink reference signals, the network node comprising processing circuitry, the processing circuitry being configured to cause the network node to:

provide instructions to the terminal device for the terminal device to generate a beam based on interference experienced by the terminal device, where, according to the instructions, the beam is to have a beam gain in those directions where a first interference level is experienced that is lower than in those directions where a second interference level is experienced, where the first interference level is higher than the second interference level; and transmit downlink reference signals in a set of beams.

* * * * *